United States Patent [19]

Parks

[11] Patent Number: 5,471,225
[45] Date of Patent: Nov. 28, 1995

[54] LIQUID CRYSTAL DISPLAY WITH INTEGRATED FRAME BUFFER

[75] Inventor: Terry J. Parks, Round Rock, Tex.

[73] Assignee: Dell USA, L.P., Austin, Tex.

[21] Appl. No.: 245,801

[22] Filed: May 17, 1994

Related U.S. Application Data

[63] Continuation of Ser. No. 55,174, Apr. 28, 1993, abandoned.

[51] Int. Cl.$^6$ .................................................. G02F 1/133
[52] U.S. Cl. ................... 345/98; 345/85; 345/90; 345/205
[58] Field of Search ................... 307/247.1, 571, 307/573; 359/57, 58, 59; 345/85, 98, 205, 90

[56] References Cited

U.S. PATENT DOCUMENTS

| | | | |
|---|---|---|---|
| 3,564,135 | 2/1971 | Weimer | 345/205 X |
| 4,042,854 | 8/1977 | Luo et al. | 345/205 X |
| 4,430,648 | 2/1984 | Togashi et al. | 345/205 |
| 4,432,610 | 2/1984 | Kobayashi et al. | 340/784 X |
| 4,677,314 | 6/1987 | Shirato et al. | 340/784 X |
| 4,870,298 | 9/1989 | Telefus | 307/247.1 X |
| 4,904,989 | 2/1990 | Matsui et al. | 340/784 X |
| 5,079,606 | 1/1992 | Yamamura et al. | |
| 5,086,347 | 2/1992 | Ukai et al. | |

FOREIGN PATENT DOCUMENTS 0148929  7/1987  Japan ........................................ 359/59

OTHER PUBLICATIONS

T. A. Larsen and D. H. Martin, Liquid Crystal Display with Built–in Refresh, IBM, vol. 23, No. 6, Nov. 1980, pp. 2559–2560.

*Primary Examiner*—Ulysses Weldon
*Attorney, Agent, or Firm*—David McCombs; James Huffman

[57] ABSTRACT

An improved liquid crystal display (LCD) is provided having a static random access memory located within each liquid crystal control cell and between each display electrode and corresponding bit and word lines. The memory cell, or storage cell, includes a pass-gate transistor which, upon activation via word line, forwards bit line video data to a memory circuit, such as a latching circuit, placed between the pass-gate transistor and the display electrode. The latching circuit may consist of two thin-film transistors connected as cross-coupled inverters for latching video data upon the display electrode for virtually an indefinite period of time or until the pass-gate transistor is again activated. By utilizing a storage cell with buffer capability adjacent each display electrode, problems associated with large data line current can be minimized. Moreover, the static memory can rid the host processor of having to continuously refresh the LCD active matrix.

18 Claims, 3 Drawing Sheets

LIQUID CRYSTAL DISPLAY WITH INTEGRATED FRAME BUFFER

This is continuation application Ser. No. 08/055,174 filed Apr. 28, 1993, now abandoned

BACKGROUND OF THE INVENTION

1. Field of the Invention

This invention relates to an electronic display and more particularly to a liquid crystal display and a storage cell configured within the display for storing and buffering video data therein.

2. Background of the Relevant Art

Liquid crystal displays (LCDs) have become a very popular form of electronic display and are well known. LCDs operate as light modifiers or light valves. As such LCDs are not self-illuminating but instead, operate by modifying ambient incoherent light supplied by an external source such as the sun, a table lamp or other room light sources. A conventional LCD comprises a liquid crystal medium hermetically sealed between a pair of glass plates. On the outer surface of each glass plate is a polarizing filter, wherein the filter on one glass plate may be capable of polarizing light at a different angle than the filter on the other glass plate. If electrodes on the inner surface of each glass plate are subject to a voltage differential, a resulting electric field perpendicular through the liquid crystal plane can re-orient the molecules. For example, during times in which an electric field is not present, polarized light from one filter can be aligned with the other filter to allow light to pass completely through the LCD. Conversely, during times in which an electric field is present, the molecules will orient themselves such that the polarized light from one filter will be blocked by the other filter. The orientation of liquid crystal molecules in the presence of an electric field is well known and may be described as dynamic scattering or twisted nematic (TN) phenomena.

Turning now to the block diagram of FIG. 1, LCD 10 can receive video data and be addressed via VGA controller 12. VGA controller 12 can provide direct interface to an I.B.M.®-compatible AT, XT or PS bus 14. A suitable VGA controller 12 can be obtained from Cirrus Logic, Inc., Fremont, Calif., part no. CL-GD6410. VGA controller not only provides direct interface to host 16 via bus 14, but also synchronizes refresh and clocking operations between bus 14 and LCD 10 via clock sync. 18 of common design.

Video information is generally transmitted over buses 14, 22 and 24, and between LCD 10 and a video dynamic access memory (DRAM) 20. VGA controller 12 operates to address and to read and write video data to and from DRAM 20. DRAM 20 is addressed and the appropriate data signal transmitted according to conventional memory addressing techniques, whereby the resulting data is sent to a select pixel within LCD 10. DRAM 20 is typically placed within or near host computer 16 and is separate or remote from LCD 10. Host 16 transmits video information over bus 14 to VGA controller 12 for writing into video DRAM 20. VGA controller 12 handles all host 16 read and write accesses to DRAM 20. VGA controller 12 associates with each pixel of LCD 10 a corresponding region of DRAM 20. The VGA controller 12 maintains an image on LCD 10 by continuous refresh, wherein, in an iterative and sequential fashion, regions of DRAM 20 are read and sent to the corresponding pixel of LCD 10 across bus 24. This refresh operation consumes a substantial portion of the bandwidth of DRAM 20 and its associated bus 22. Host 16 performs read and write accesses to DRAM 20 to effect drawing operations. By changing a region in DRAM 20, the corresponding pixel on LCD 10 will be affected. It is desirable to maintain a large bandwidth of host 16 accesses into DRAM 20 in order to provide for high performance drawing operations. This is in direct competition with the fixed and large bandwidth requirement for LCD 10 refresh.

Turning now to FIG. 2, an exploded view of LCD 10 according to a prior design is shown. LCD 10 includes a pair of glass plates or panels 22 and 24, and on the outer surface of each glass panel is a polarizer filter. Polarizer filter associated with panel 22 is denoted as reference numeral 26 and polarizer filter associated with panel 24 is denoted as reference numeral 28. On the inside surface of glass panel 22 is a common electrode 30, often called the "backplane" of the LCD. On the inside surface of glass panel 24 is a lithography-produced topography comprising a matrix or grid of orthogonally placed conductors, active devices and separate electrodes, the separate electrodes are often called "display electrodes." The conductors are used to carry video data and addressing signals sent to and from VGA controller 12. Specifically, electrodes which receive video data are designated as bit lines 32, wherein the bit lines are spaced parallel from each other. Video data on one bit line can be read into or written from a select display electrode 36 by a word line 34 spaced parallel to other word lines 34 and substantially perpendicular to each bit line 32. Word lines 34 are thereby used to randomly address a select display electrode 36 with video data contained within a respective bit line 32. The addressing scheme and methodology is well known and generally follows standard DRAM multiplexing techniques. Placed adjacent each display electrode 36 within the matrix is a pass-gate transistor 38 which, depending upon the voltage state upon its gate terminal, transmits bit line video data to and from electrode 36. Additional details regarding the layout and connection configuration between bit line 32, word line 34, display electrode 36, and pass-gate transistor 38 are provided hereinbelow.

Placed over the inside surface topography of conductors 32 and 34, over transistors 38, and over display electrodes 36 is a dielectric layer (not shown) of sufficient insulative quality to electrically isolate bit lines 32, word lines 34 and transistors 38 from each other and from an adjacent liquid crystal medium 40. When brought together, liquid crystal medium 40 is in contact with the dielectric material and is in electric field contact with the display electrodes 36 which are voided by standard etching techniques of dielectric material immediately thereabove. It is understood that alignment coatings and/or passivation coatings (not shown) are generally placed between electrode 30 and liquid crystal medium 40 as well as between each display electrode 36 and liquid crystal medium 40 to ensure current flow will not occur through the medium and that only electric field will be selectively present.

LCDs operate by either permitting the transferral of light between the glass panels or by blocking the light at select regions, often called "pixel" regions generally represented by the geometric size of individual display electrodes 38. Incoherence, ambient light 42 can be transmitted or reflected into one surface of LCD 10 allowing filter 28 to polarize light 42 to a coherent, linearly polarized state. The polarized light can either be re-aligned such that it passes through second filter or, if electric field is present, the light can be blocked by the second filter. Accordingly, sections of light or pixel regions can present themselves as relatively light or relatively dark areas necessary for visual contrast detection.

Referring now to FIG. 3, a partial circuit schematic of LCD 10 of a prior design is shown. One cell within a plurality of cells (or matrix) is shown having display electrodes 36 connected to the source-drain path of pass-gate transistors 38. Pass-gate transistors are activated by an appropriate voltage level upon its gate. Pass-gate transistors are manufactured upon glass panel 24 according to standard semiconductor processing and may be configured as thin film, n-channel, enhancement-type MOSFETs. Once the voltage upon word line 34 exceeds a threshold amount, pass-gate transistor 38 allows video data within respective bit line 32 to pass through the source-drain path and onto display electrode 36. Common electrode 30 provides a uniform voltage state upon one side of liquid crystal media 40 such that electric field selectivity is entirely controlled by the voltage state of respective display electrodes 36 and its associated bit line 32 voltage.

Referring now to FIG. 4, a two-dimensional view of an active matrix addressing scheme of a typical prior design is shown. The active matrix receives video data from the remote DRAM and presents the data as input signals (DI) to buffer 44. Buffer 44 must generally present significant current drive in order for the attached bit line to refresh an entire row or column of display electrodes. Large amounts of current driven through the elongated bit line can oftentimes become capacitively coupled to overlying word lines which are separated by a fairly thin layer of dielectric material described above. Capacitive coupling between bit and word lines is dramatically increased whenever the current associated with those lines is significant. Further, the very small distances which separate the bit and word lines make capacitive coupling between those lines a major problem. Capacitive coupling to an overlying word line may partially activate a cell which should not be active. Partial activation will appear to reduce the contrast of the cells which are targeted to be on. The resulting contrast-reducing phenomena is often referred to as "ghosting." To overcome ghosting, the dielectric material must be made thicker at the location between the bit and word lines or, the current transmitted through the respective bit and word lines must be reduced. It is not recommended, however, that the dielectric material be increased in thickness since any increase in cell thickness can reduce the visual angle, or viewing angle of the LCD. Factors such as viewing angle and contrast are critical to satisfactory LCD performance. As viewing angle decreases, so does the contrast. The rate of decrease of contrast in relation to viewing angle is a function of the ratio of the smallest dimension of the display electrode or cell to its thickness. If thickness is increased only slightly, the viewing angle and contrast will inversely decrease.

Another problem associated with large drive or buffered currents placed within elongated bit and/or word lines extending across the panel is the need for larger current-carrying conductors. Conductors of larger diameter are necessary to handle the drive currents and, as such, the larger diameter conductors will require larger surface real estate thereby taking away from the area available for display electrodes 36. The result being smaller display electrodes and larger spacing between electrodes. Smaller display electrodes thereby presents a smaller pixel area and reduced image contrast and clarity at the object or image edge.

A still further problem associated with large drive currents within bit and/or word lines is that which is commonly referred to as "smearing." A large current presented upon the word lines or bit lines presented to a column or row of pass-gate transistors may force the respective transistors into a saturation region. A saturated pass-gate transistor may not quickly turn off at the desired moment, causing a "smeared" object or image to appear as it moves across the screen. Although thin film transistors with low thresholds operating in the linear region generally avoid this problem, the transistors nevertheless can be inadvertently overdriven by large buffer outputs connected to elongated bit lines and associated source terminals.

SUMMARY OF THE INVENTION

The problems outlined above are in large part solved by the improved LCD of the present invention. That is, the improved LCD hereof comprises bit lines and word lines which need not carry large buffered currents. Specifically, buffering or driving currents necessary to charge respective display electrodes are provided within each liquid crystal cell by a storage cell of the present invention. The storage cell provides static random access memory (SRAM) as well as current and voltage drive to the display electrode load. Accordingly, by placing memory for each display electrode or pixel directly adjacent to the respective electrode and within each cell, lesser current is needed within the bit lines since the bit lines themselves do not produce the drive. Drive current within the bit lines need only exceed that necessary to activate the storage cell. Once activated, the bit line current is buffered via storage cell/buffer and presented to the display electrode. The buffered output is remote from the cross-over word line locations thereby leaving less chance for capacitive coupling thereto.

By configuring the memory cell and drive buffers between the bit line and the display electrode, the present configuration can achieve significantly reduced bit line current and thereby obviate the problems associated therewith. Specifically, the pass-gate transistor can toggle at a high speed and within a linear range, and the bit line video data can be stored at the display electrode for a virtually indefinite period of time. Lower bit line currents reduce the problems of ghosting and smearing as described above, and SRAM at each display electrode cell eliminates the necessity for predisposing bus line bandwidth and host processor operation.

Broadly speaking the present invention contemplates a storage cell having random access capable of storing video data within a LCD. The storage cell comprises a display electrode and a storage element arranged within the LCD. The storage element is coupled to the display electrode, and the storage element includes a source-drain path capable of receiving video data during times in which the source-drain path is conductive. The storage element further includes a latching circuit coupled between the source-drain path and the display electrode for storing the video data upon the display electrode.

The present invention further contemplates a LCD having a plurality of storage cells arranged in a matrix and operatively coupled to read and write video data into and from, respectively, the LCD. The plurality of storage cells comprises a substantially transparent glass material and a plurality of bit lines and word lines extending across at least a portion of the glass material. The bit lines and the word lines comprise indium tin oxide. A plurality of display electrodes are also provided across at least a portion of the glass material, coplanar with each other. Also arranged upon the glass material is a plurality of pass-gate transistors. Each pass-gate transistor having a drain terminal connected as an output, a source terminal connected to one of the plurality of bit lines, and a gate terminal connected to one of the plurality of word lines. One of the plurality of pass-gate transistors is capable of reading video data on one of the plurality of bit lines from the respective source terminal to the respective drain terminal during times in which one of the plurality of word lines is active. A plurality of latching circuits is also provided, wherein each latching circuit is connected between one of the plurality of display electrodes and the drain terminal of one of the plurality of pass-gate transistors. The latching circuit is capable of storing, without refresh, the video data upon one of the plurality of display terminals.

As defined herein, "without refresh" refers to video data capable of being stored upon the display electrode for a virtually indefinite period of time. The charge remains stored for a time subsequent to the pass-gate transistor no longer being active and prior to the time in which the pass-gate transistor becomes again active. Thus, voltage can be statically stored in the storage cell and buffer of the present invention using a latching technique with cross-coupled thin-film transistors arranged as cross-coupled inverters.

BRIEF DESCRIPTION OF THE DRAWINGS

Other objects and advantages of the invention will become apparent upon reading the following detailed description and upon reference to accompanying drawings in which.

Figure 1:
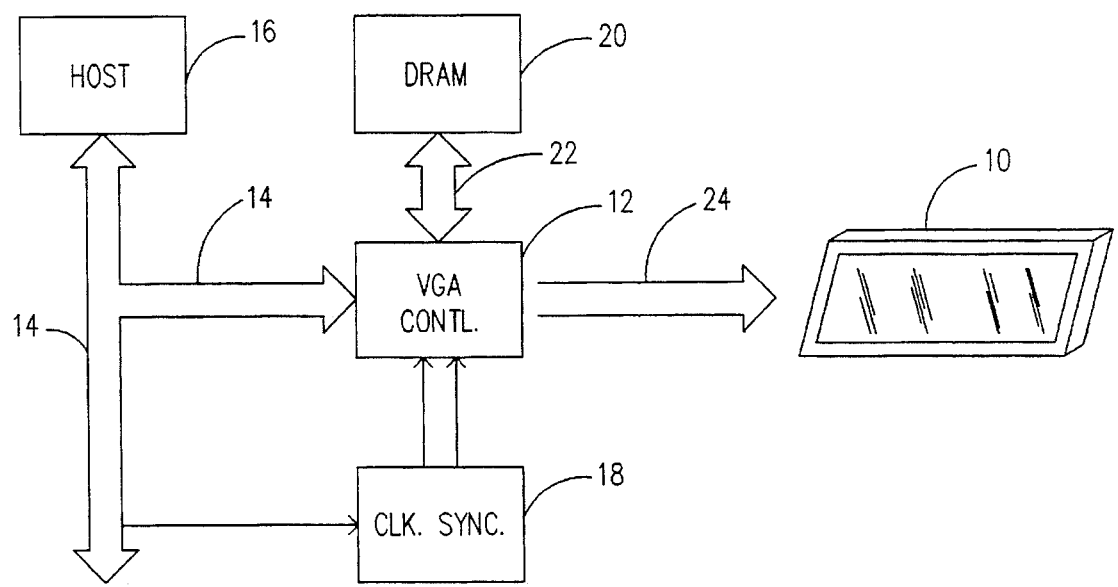
FIG. 1 is a block diagram of a LCD addressing structure according to a prior design.
Figure 2:
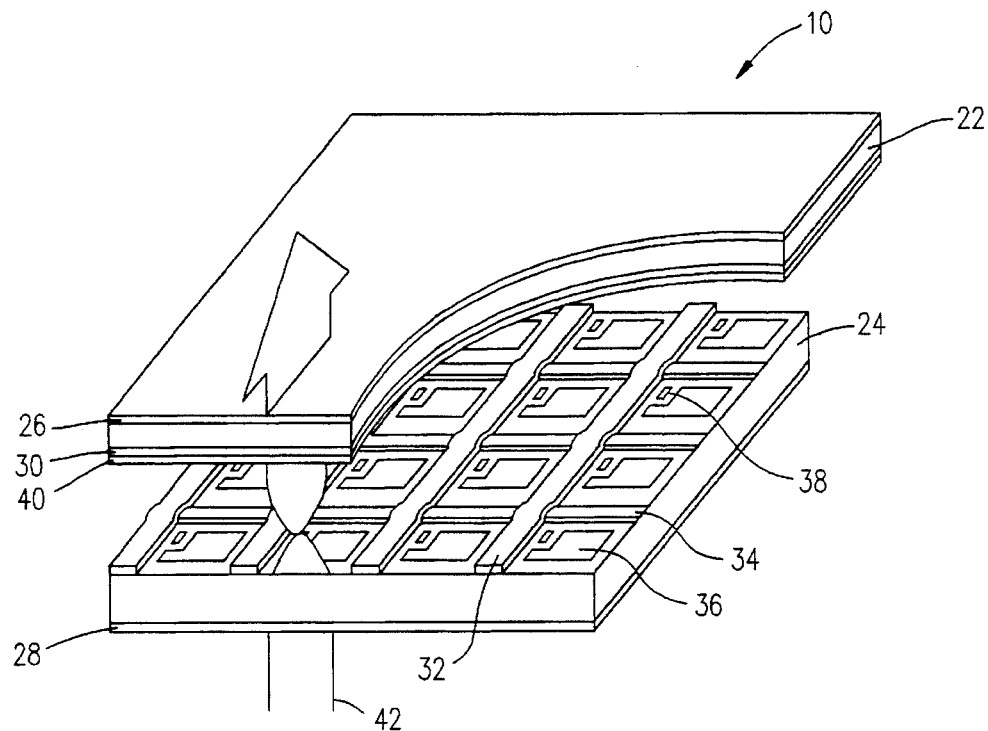
FIG. 2 is a exploded perspective view of a LCD according to a prior design.
Figure 3:
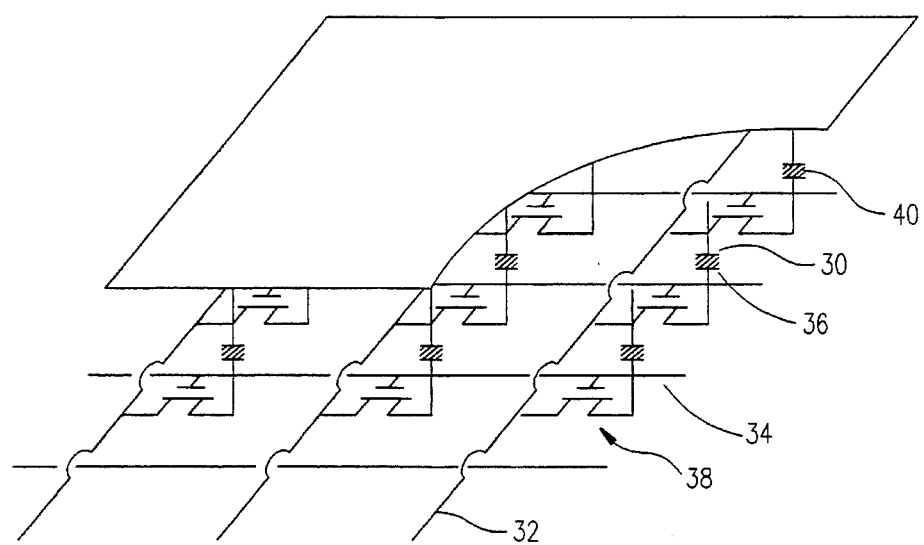
FIG. 3 is a three-dimensional circuit schematic of the control matrix and pass-gate transistors associated with the prior design LCD shown in FIG. 2.
Figure 4:
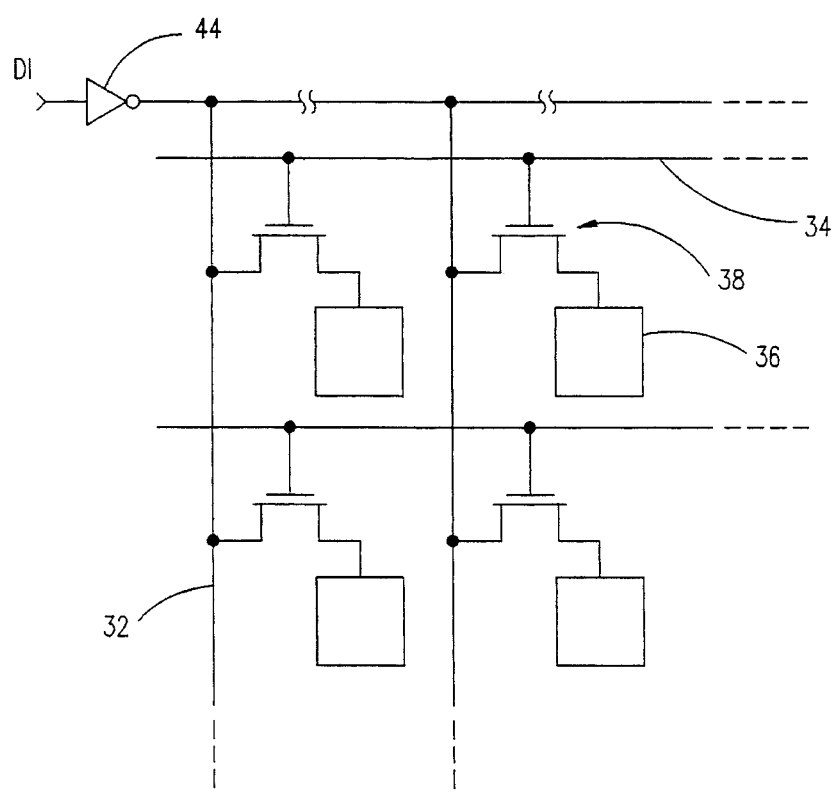
FIG. 4 is a two-dimensional circuit schematic of four liquid crystal cells and associated addressing electronics placed within an array according to a prior design LCD active matrix.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Figure 5:
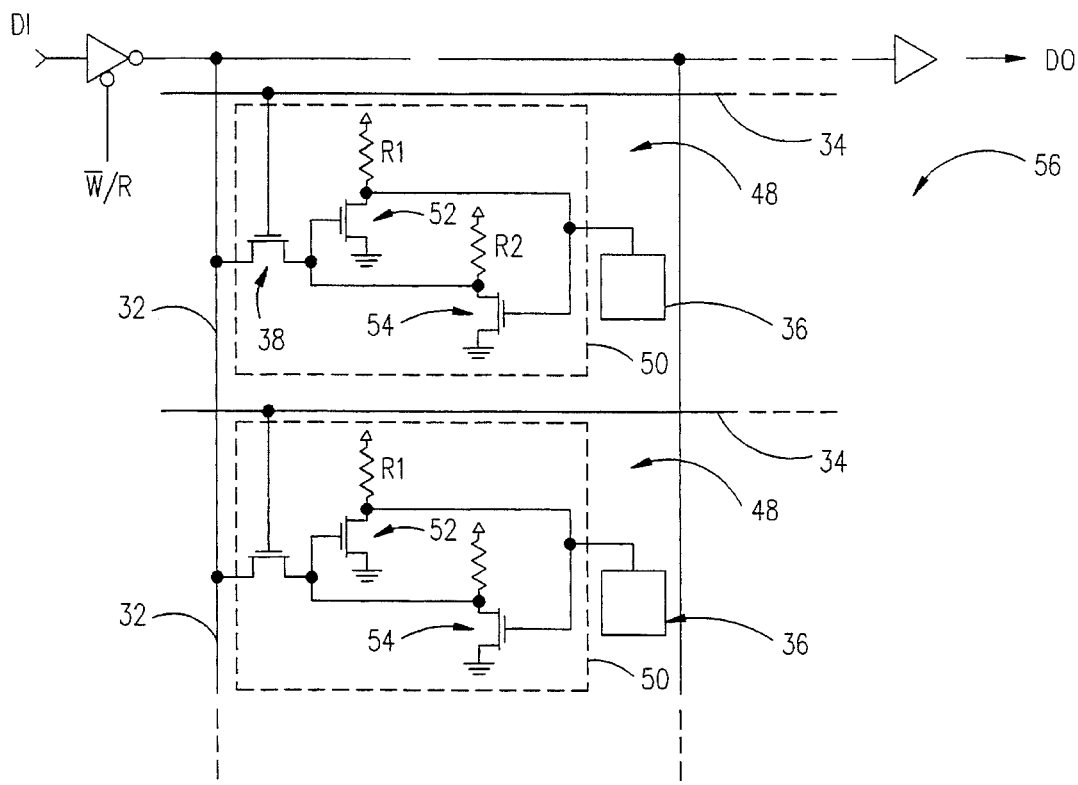
FIG. 5 is a circuit schematic of two liquid crystal cells and adjacent storage cells placed within an array according to the present invention.

Turning now to FIG. 5, a circuit schematic of two liquid crystal cells with static storage capability is illustrated. It is understood, however, that numerous cells can be arranged as a matrix or array across the corresponding glass panel. However, for simplicity in illustration, only two storage cells 48 are depicted. Each storage cell 48, within a matrix of storage cells extending across LCD 10, comprises a display electrode 36 and a storage element 50. Each storage element 50 is capable of latching or storing in static random access configuration necessary voltage levels upon select display electrodes 36 via a memory circuit within storage element 50. Storage element 50 also buffers low current input of bit line 32 to a necessary charge level and presents that charge level upon display electrode 36.

Storage and buffering is achieved by utilizing a pass-gate, thin-film transistor 38 coupled to respective bit line 32 and word line 34. Pass-gate transistor 38 includes a source-drain path which can be modulated by voltage levels upon the gate of the transistor. The drain of pass-gate transistor 38 is coupled to cross-coupled thin-film first and second transistors 52 and 54, respectively. The output or drain terminal of first transistor 52 is connected to one end of a pull-up resistor (or load resistor R1), gate terminal of second transistor 54, and display electrode 36. Likewise, the output or drain terminal of second transistor 54 is connected to one end of pull-up (or load resistor R2), the drain of pass-gate transistor 38 and the gate terminal of first transistor 52.

The cross-coupled arrangement with suitable charge amplification or buffering thereby requires four low-current carrying conductors for each storage cell. The first conductor is used by word line 34, and the second conductor is used by bit line 32. The third conductor provides VCC for load resistors R1 and R2, and the fourth conductor provides ground at the source terminal of first and second transistors 52 and 54. Four conductors do not necessary present a problem if the conductors are arranged in a close configuration and are dielectrically separated from one another such that the area available to display electrode 36 remains maximized. Maximum electrode area or pixel size can be achieved by stacking, for example, the VCC conductors above the bit lines and stacking the ground conductor above the word line, such that when viewing the LCD perpendicular to the LCD's plane, all four conductors appear as two orthogonally arranged conductors with display-electrodes therebetween.

Thin film transistors can be fabricated directly upon the glass substrate accordingly to the well known inverted staggered configuration within n+ back-etch. The gate metal is deposited and patterned first followed by the deposition of the gate insulator (often $Si_3N_4$), undoped a-Si, and doped n+ layers by, e.g., plasma enhanced chemical vapor deposition (PECVD). The a-Si layer is patterned into islands at the thin film transistor locations and at the cross-over area of bit and word lines. After deposition and patterning of the source-drain metal, the n+ layer in the channel can be removed by etching and a passivation layer is deposited to protect the channel. The n+ layer provides a low-resistance ohmic contact for source and drain and suppresses hole injection at negative gate voltages. Other forms of inverted staggered thin film transistors such as the well known trilayer-type is also suitable.

It is important to note that first transistor 52 in combination with load resistor R1 make up a first inverter. Transistor 54 in combination with load resistor R2 make up a second inverter. The two inverters are cross-coupled, the output of the first inverter drives the input of the second inverter, and the output of the second inverter drives the input of the first inverter. Video data is written into storage element 50 by pass-gate 38 which is sized large enough to overdrive second transistor 54.

Figure 6:
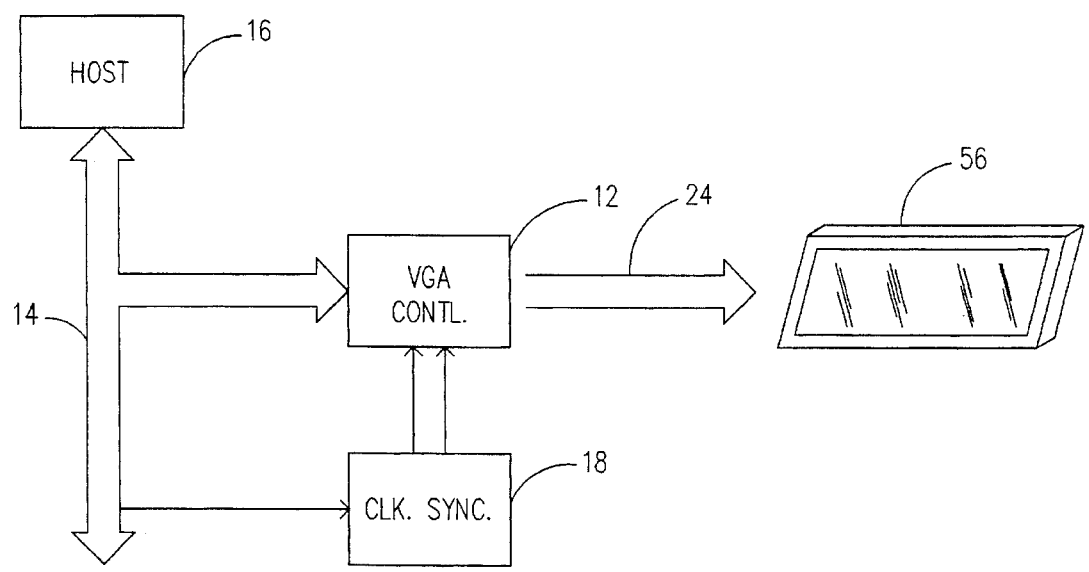
FIG. 6 is a block diagram of a LCD addressing structure utilizing the LCD of the present invention.

Referring now to FIG. 6, a block diagram of an addressing scheme utilizing the improved LCD 56 of the present invention is shown. Specifically, host 16 can directly address, send and receive video data to and from LCD 56 via VGA controller 12. The VGA controller 12 does not have to continuously refresh the data. Moreover, the memory, in the form of SRAM, is placed directly within the LCD active matrix to allow data retention without refresh. By incorporating memory within the LCD array, host processor 16 and communication bus 14 and 24 are more optimally used to increase data throughput necessary for depicting images or objects which rapidly move across the LCD panel. As such, the present invention achieves faster registration of the image without incurring problems such as smearing or ghosting.

It will be appreciated to those skilled in the art having the benefit of this disclosure that this invention is believed to be capable of applications with numerous types of liquid crystal displays, and is preferably used in dot matrix LCDs having high resolution output. Furthermore, it is also to be understood that the form of the invention shown and described is to be taken as an exemplary presently preferred embodiment. Various modifications and changes may be made without departing from the spirit and scope of the invention as set forth in the claims. An exemplary modification might be one which uses other forms of transistors or thin-film transistor geometries and/or assembled in varying array or matrix configurations. It is intended that the following claims be interpreted to embrace all such modifications and changes.

What is claimed is:

1. A storage cell capable of storing video data within a liquid crystal display, comprising:

a display electrode arranged within said liquid crystal display;

a storage element arranged within said liquid crystal display, said storage element comprising:

a source-drain path for receiving video data when said source-drain path is conductive; and a memory circuit having first and second transistors, each of said transistors having a gate and first and second terminals, said first terminals being connectable to a power supply, said second terminals being grounded, said first terminal of said first transistor being further connected to said gate of said second transistor and said source-drain path, said first terminal of said second transistor being further connected to said gate of said first transistor and said display electrode, thereby storing said video data and providing driving current and voltage to charge said display electrode.

2. The storage cell as recited in claim 1, wherein said storage cell and connected said display electrode are arranged as a matrix across a glass plate, and each said display electrode is exposed to a liquid crystal material hermetically sealed within said liquid crystal display.

3. The storage cell as recited in claim 1, wherein said video data is transmitted over a conductive bit line, and said bit line is routed to said source-drain path.

4. The storage cell as recited in claim 1, wherein said source-drain path is rendered conductive during times in which a word line, routed to a gate region of a pass-gate transistor having said source-drain path, is active.

5. The storage cell as recited in claim 1, wherein said first and second transistors are metal oxide semiconductor field effect transistors and said first terminal is a drain and said second terminal is a source.

6. A liquid crystal display device having a plurality of storage cells arranged in a matrix and operatively coupled to red and write video data into and from, respectively, the liquid crystal display, the plurality of storage cells comprising:

a substantially transparent glass material;

a plurality of bit lines substantially parallel to each other extending across at least a portion of said glass material;

a plurality of word lines substantially parallel to each other and substantially perpendicular to said bit lines extending across at least a portion of said glass material;

a plurality of display electrodes arranged coplanar with each other and extending across at least a portion of said glass material;

a plurality of pass-gate transistors, each pass-gate transistor having a first terminal connected as an output, a second terminal connected to one of said plurality of bit lines, and a gate connected to one of said plurality of word line, whereby one of said plurality of pass-gate transistors is capable of reading video data on one of said plurality of bit lines from said respective second terminal to said respective first terminal during times in which one of said plurality of word lines is active; and a plurality of memory circuits in corresponding relation with said plurality of pass-gate transistors and said plurality of display electrodes, each of said memory circuits having first and second corresponding transistors, each of said transistors having a gate and first and second terminals, said first terminals being connectable to a power supply, said second terminals being grounded, said first terminal of each of said first transistors being further connected to said gate of said corresponding second transistor and said second terminal of said corresponding pass-gate transistor, said first terminal of each of said second transistors being further connected to said gate of said corresponding first transistor and said corresponding display electrode, whereby each of said memory circuits is capable of storing said video data voltage to charge said corresponding display electrode.

7. The liquid crystal display device as recited in claim 6, further comprising a substantially planar common electrode, a dielectric material, and a liquid crystal material capable of polarizing a light beam, said liquid crystal material being interposed between said substantially planar common electrode and said dielectric material, said dielectric material covering each bit line, each word line, each transistor and each memory circuit.

8. The liquid crystal display device as recited in claim 6, further comprising a substantially planar common electrode and a liquid crystal material capable of polarizing light, said crystal material being interposed between said substantially planar common electrode and said plurality of display electrodes arranged coplanar with each other.

9. The liquid crystal display device as recited in claim 6, wherein said bit lines and said word lines are conductive and transparent.

10. The liquid crystal display device as recited in claim 6, wherein said bit lines and said word lines comprise indium tin oxide.

11. The liquid crystal display device as recited in claim 6, wherein said plurality of pass-gate transistors are responsive to an activated word line for erasing said video data stored in said memory circuit.

12. The liquid crystal device as recited in claim 6, wherein said pass-gate transistors, said first transistors, and said second transistors are thin film metal oxide semiconductor field effect transistors and said first terminal is a drain and said second terminal is a source.

13. A liquid crystal display comprising:

a first glass material having a common electrode extending across a substantial portion of one surface of said first glass material;

a second glass material having one surface adapted for receiving:

a plurality of spaced, substantially coplanar display electrodes;

a plurality of pass-gate transistors, each of said pass-gate transistors having a source-drain path and a gate terminal, wherein a data signal is passed through said source-drain path when said gate terminal of said pass-gate transistor is activated;

a plurality of latching circuits, each of said latching circuits comprising a pair of cross-coupled first and second transistors, each of said transistors having a gate, a drain connected to a pull-up resistor, and a source connected to a ground, wherein said drain of said first transistor is connected to said display electrode and to said gate of said second transistor and wherein said drain of said second transistor is connected to said drain of said pass-gate transistor and to said gate of the first transistor;

a liquid crystal material interposed between said common electrode and said plurality of display electrodes; and a dielectric material interposed between said liquid crystal material and said plurality of pass-gate transistors and latching circuits, each of said plurality of latching circuits storing and providing driving current and voltage to charge a respective one of said plurality of display electrodes.

14. The liquid crystal display as recited in claim 13, wherein each said display electrode is arranged in close proximity to one of said plurality of pass-gate transistors and one of said plurality of latching circuits to form a pixel region.

15. The liquid crystal display as recited in claim 14, wherein said pixel region is arranged adjacent other pixel regions to form an array of pixels extending across the surface of said second glass material.

16. The liquid crystal display as recited in claim 13, wherein said video data is transmitted over a conductive word line, and said word line is routed to said source-drain path.

17. The liquid crystal display as recited in claim 13, wherein said source-drain path is rendered conductive during times in which a bit line, routed to said gate terminal of said pass-gate transistor having said source-drain path, is active.

18. The liquid crystal display as recited in claim 13, wherein said pass-gate transistors and said cross-coupled first and second transistors are thin film metal oxide semiconductor field effect transistors.

* * * * *